US009491374B1

(12) United States Patent
Avrahami et al.

(10) Patent No.: US 9,491,374 B1
(45) Date of Patent: Nov. 8, 2016

(54) SYSTEMS AND METHODS FOR VIDEOCONFERENCING INPUT AND DISPLAY MANAGEMENT BASED ON ACTIVITY

(71) Applicant: FUJI XEROX CO., LTD., Tokyo (JP)

(72) Inventors: Daniel Avrahami, Mountain View, CA (US); Jennifer Marlow, Palo Alto, CA (US); Eveline van Everdingen, Hague (NL)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/966,365

(22) Filed: Dec. 11, 2015

(51) Int. Cl.
    *H04N 7/14* (2006.01)
    *H04N 5/247* (2006.01)
    *H04N 7/15* (2006.01)
    *G06K 9/00* (2006.01)
    *G06K 9/46* (2006.01)

(52) U.S. Cl.
    CPC .......... *H04N 5/247* (2013.01); *G06K 9/00268* (2013.01); *G06K 9/46* (2013.01); *H04N 7/15* (2013.01); *G06K 2009/4666* (2013.01)

(58) Field of Classification Search
    USPC ......... 348/14.01, 14.08, 14.09, 14.1, 211.12; 379/93.21, 158, 202.01, 205.01
    See application file for complete search history.

(56) References Cited

U.S. PATENT DOCUMENTS

| 6,680,745 B2* | 1/2004 | Center, Jr. ............. | H04N 7/148 348/14.08 |
| 8,248,448 B2* | 8/2012 | Feng .................. | G06K 9/00234 348/14.01 |

OTHER PUBLICATIONS

"Polycom EagleEye Producer", 2015 http://www.polycom.com/products-services/hd-telepresence-video-conferencing/realpresence-accessories/eagleeye-producer.html#stab1 (accessed on Dec. 10, 2015).
Giger, D., Bazin, J. C., Kuster, C., Popa, T., & Gross, M., "Gaze Correction with a Single Webcam," in IEEE International Conference on Multimedia & Expo. (2014).

\* cited by examiner

*Primary Examiner* — Yosef K Laekemariam
(74) *Attorney, Agent, or Firm* — Procopio, Cory, Hargreaves & Savitch LLP (57) ABSTRACT

Systems and methods of managing a videoconference viewed by a first camera coupled to a first display are provided, including, for a face not detected by the first camera and a second camera coupled to a second display in a user environment, performing an action based on off-display analysis; for a face direction less head-on in the first camera than in the second camera, switching the videoconference to the second camera; and for the face direction not detectable in the first camera, and on-display user activity at the second display, switching the videoconference to the second camera.

23 Claims, 7 Drawing Sheets

SYSTEMS AND METHODS FOR VIDEOCONFERENCING INPUT AND DISPLAY MANAGEMENT BASED ON ACTIVITY

BACKGROUND

1. Field

Systems and methods are provided that relate to detecting activity associated with a multi-camera user environment during remote collaborative meetings, and determining an action based on the detected activity. More specifically, systems and methods are provided for detecting on-display activity, off-display activity and head-pose of a user to determine whether to maintain a current camera or switch to another camera in the user environment.

2. Related Art

In the related art, one or more users may participate in a videoconference from a remote location with respect to other users. During the videoconference, the users may be able to also receive notifications, communication, and immediate access to other information. Accordingly, the user may experience a desire to multitask during the videoconference. For example, but not by way of limitation, a user participating in a videoconference may desire to shift his or her attention away from the camera and display associated with the video conference based on a notification or communication received on another display or another device (e.g., mobile phone).

Related art studies have focused on how different computing configurations might impact the perception of multitasking during a videoconference on other users. Specifically, multitasking has been considered in related art studies for the case of a user participating in a videoconference with a single-display configuration, or a dual-display configuration.

The results of the related art studies have indicated that multitasking in the dual-display configuration is perceived by other observing participants users in the videoconference as being more obvious. Accordingly, the multitasking behavior on the dual-display configuration was rated as significantly less polite and less acceptable in the related art studies. Further, when multitasking was rated as more obvious, the rating of engagement in the videoconference dropped. Such negative perceptions are problematic, particularly if multitasking is in fact related to the videoconference.

Figure 1:
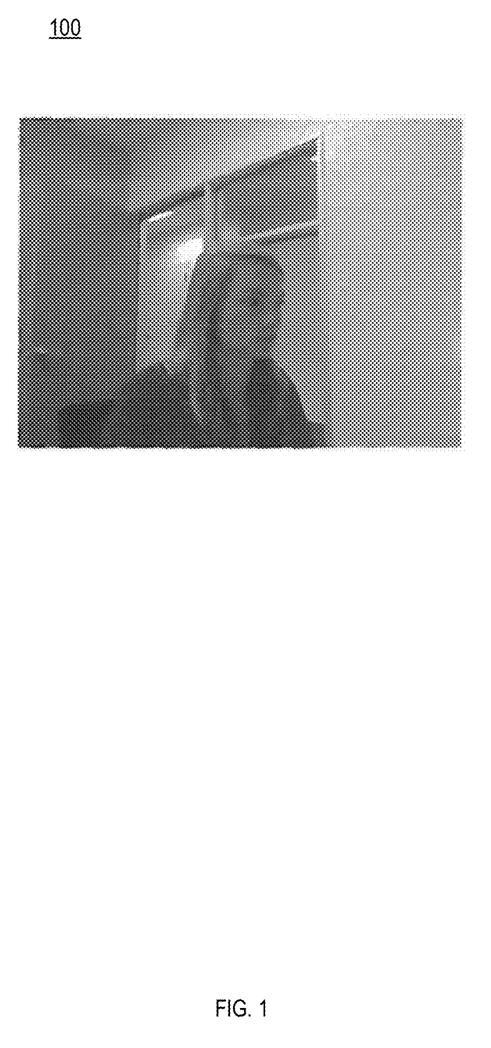
FIG. 1 illustrates a related art view of a user that is engaged in multitasking behavior on a dual-display configuration.

For example, FIG. 1 illustrates a related art view of a user that is engaged in multitasking behavior on a dual-display configuration. As can be seen, the gaze of the user (e.g., eye position) as well as the head pose of the user are not facing to the camera, but are turned to the left of the user (or, right of the observing participant). The multitasking appears obvious, and the user does not appear to be engaged in the videoconference. Negative perceptions of engagement in the videoconference may negatively impact all parties in the videoconference.

Therefore, it may be desirable to develop systems and methods which may compensate for the multitasking of the user in a multi-display user environment, so that the multitasking appears less obvious, and that the user appears to be more engaged in the videoconference.

SUMMARY

Example implementations described herein provide systems and methods for managing a videoconference viewed by a first camera coupled to a first display, including, for a face not detected by the first camera and a second camera coupled to a second display in a user environment, performing an action based on off-display analysis; for a face direction that is less head-on in the first camera than in the second camera, switching the videoconference to the second camera; and for the face direction not detectable in the first camera, and on-display user activity detected at the second display, switching the videoconference to the second camera.

According to the example implementations, the on-display user activity includes at least one of an input/output event and an application event. The input/output event may include one or more of a pointing device action, including but not limited to a mouse, touchpad, stylus, and touchscreen, and a keyboard action associated with cursor activity on the second display. Further, wherein the application event includes determining that a function of an online application is being accessed at the second display, estimating a time duration that the online application will be accessed by applying a rule that is based on the function of the application, and based on the estimated time duration being greater than a prescribed period, performing the switching the videoconference to the second camera.

Additionally, according to the example implementations, the switching the videoconference to the second camera further comprises determining to switch to the second camera, confirming that a first prescribed time period has elapsed since the determining, based on the confirming, switching an input signal into the videoconference from the first camera to the second camera, and outputting a video to the videoconference via the second camera.

Further, according to the example implementations, the switching the videoconference to the second camera further comprises determining to switch to the second camera, confirming that no other switching operation was performed on the first camera and the second camera for a prescribed time prior to the determining, based on the confirming, switching an input signal into the videoconference from the first camera to the second camera, and outputting a video to the videoconference via the second camera.

According to the example implementations, an environment of the user of the first camera and the second camera is annotated with at least one of a positive annotation indicative of a surface or object in the environment that is to be displayed in the videoconference, and a negative annotation indicative of a surface or object in the environment that is not to be displayed in the videoconference. For example, wherein the positive annotation may be associated with a display board in the environment that is not coupled to the first camera and the second camera, and the negative annotation is associated with a doorway or window region not to be displayed, or another user.

Further, the example implementations also specify that the off-display activity comprises analyzing a video of an off-display environment of the first camera and the second camera, detecting a focus area to display in the videoconference, and performing the action, wherein the action comprises determining to switch the videoconference from the first camera to the second camera when the second camera has a view of the focus area with less obstruction and a higher degree of view than the first camera.

Additionally, according to the example implementations, the switching the videoconference to the second camera is not performed if the face direction is less head-on in the first camera than in the second camera, or if the on-display user activity occurs at the second display, for less than a prescribed time period.

The example implementations also include a system for managing a video conference, that includes a first camera coupled to a first display and a second camera coupled to a second display, a user environment adjacent to the first camera and the second camera, the user environment including at least one physical display surface not coupled to the first camera and the second camera, and a processor configured to perform an off-display analysis when a face is not detected by the first camera and the second camera, and perform an action based on the off-display analysis, switch the videoconference to the second camera when (a) a face direction is less head-on in the first camera than in the second camera, or (b) the face direction is not detectable in the first camera and on-display user activity is detected at the second display.

A non-transitory computer readable medium, storing instructions for managing videoconference input and display is also provided by the example implementations.

Other features and advantages of the present inventive concept will become more readily apparent to those of ordinary skill in the art after reviewing the following detailed description and accompanying drawings.

BRIEF DESCRIPTION OF THE DRAWINGS

The structure and operation of the example implementations will be understood from a review of the following detailed description and the accompanying drawings in which like reference numerals refer to like parts and in which.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application. Additionally, in the example implementations, the term "display" may include, but is not limited to, a monitor, display, display screen, video output, or other well-known device that provides a display to a user, as would be understood by those skilled in the art, and which may be associated with an internal or external camera. Further, the term "mouse" may include, but is not limited to, a mouse, tracking ball, touchpad, pointer, or other well-known device as would be understood by those skilled in the art.

Further, although example implementations as described herein are described in context of an online conference between remote users that includes sharing of user interfaces between users, the example implementations are not limited thereto.

Accordingly, example implementations of the methods and systems associated with the present inventive concept are directed to detecting activity associated with a multi-camera user environment during remote collaborative meetings and determining an action based on the detected activity. More specifically, the example implementations include, but are not limited to, detection on on-display activity, off-display activity and head-pose of a user to determine whether to maintain a current camera or switch to another camera in the user environment.

Aspects of the example implementations are directed to use of visual cues (e.g., face detection and pose estimation) and a user's on-display activity (e.g., keyboard or pointing device events, as well as interactions with online applications associated with a given camera), to switch between multiple camera (e.g., webcam) views. More specifically, the example implementations are directed to incorporation of aspects of a user (e.g., individual web conference participant) and related activity to infer where a user's attention is being directed, and to provide a seamless display experience. Further, the example implementations are directed to incorporating the user configurations and annotations of other areas within the field of view of the user's camera.

Similarly, the present inventive concept is directed to following the gaze of the user. In terms of hardware, two cameras may be used to make a determination as to the gaze of the user. Moreover, a depth camera may be used to judge head orientation. Functionally, the cameras receive the activity that the user is performing and can be observed on-display, as well as looking at computer-based events. When neither camera has a view of the face of the user (e.g., user writing on a marker board, physical activity such as user movement by skeleton tracking, or people walking by), other action may be taken. For example, showing of people walking by a room in which the videoconference occurs may be avoided by removing the image of the walking people from the videoconference output.

An aspect of the example implementations is directed to an office environment. Although the following disclosure discusses the environment of an office, the scope of the example implementations is not limited thereto, and other environments may be substituted therefor without departing from the inventive scope. For example, but not by way of limitation, other environments in which multi-camera videoconference may be conducted can include private environments in which a remote videoconference may be conducted, such as a residence (e.g., room in a home or an apartment), vehicle (e.g., passenger in an automobile), as well as public environments (e.g., public meeting area, restaurant, café, park, etc.), but are not limited thereto.

While the example implementations herein refer to detection of "face" or aspects thereof, other features may be substituted therefor, as would be understood by those skilled in the art, such (but not limited to) eyes, teeth, head shape, or other identifying feature of a user participating in a videoconference and that can be used to determine the degree to which the user is facing the camera that is engaged in the videoconference, to determine a degree of multitasking that can be observed by the other users based on head pose.

In the office environment according to an example implementation, multiple displays are provided. Accordingly, multiple cameras are implemented (e.g., one camera per display). For example, but not by way of limitation, a display having a built-in camera may be employed, as well as a display having an external camera connected via bus (e.g., universal serial bus (USB) or the like). Further, the videoconference system is equipped with software (e.g., a non-transitory computer-readable medium containing instructions stored in a memory).

The instructions in the memory (e.g., software) are configured to switch between a first camera and a second camera (e.g., between the camera on the first display and the camera on the second display), so as to provide the observing user in the videoconference with the impression of engagement in the videoconference. For example, but not by way of limitation, head-pose and gaze-tracking are implemented, combined with an understanding of the activities associated with a user, both on and off the displays.

Figure 2:
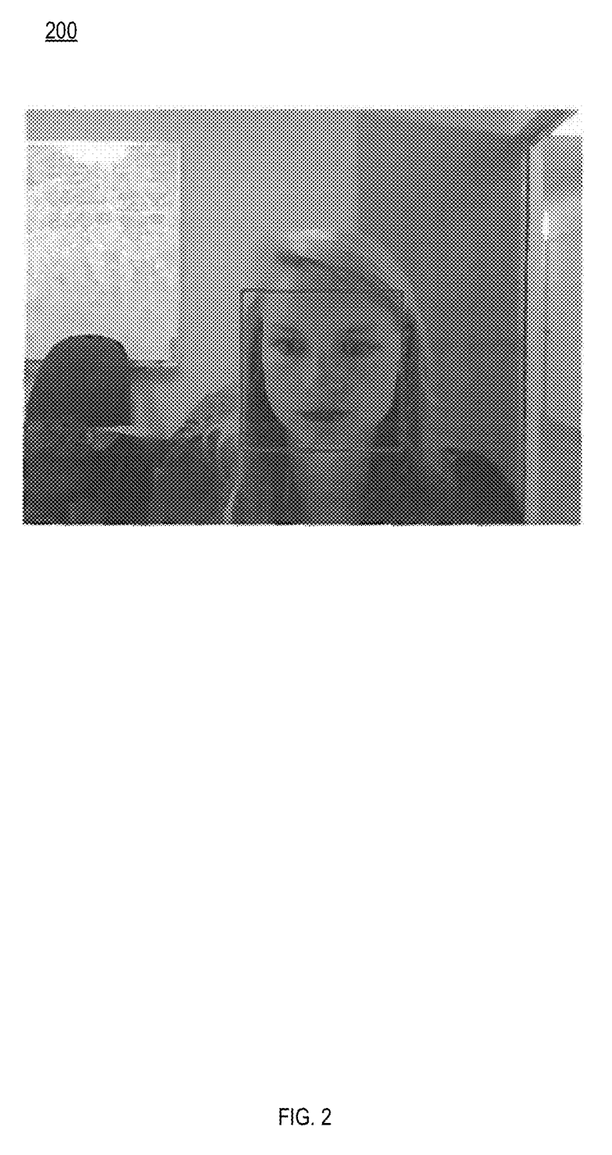
FIG. 2 illustrates an example view of a user engaged in a videoconference and in multitasking behavior on a dual-display configuration according to an example implementation.

FIG. 2 illustrates an example view of a user engaged in a videoconference in a multi-display environment. Based on an input (e.g., head-pose, gaze-tracking, and/or activities associated with the user), it was determined that the user may be multitasking, by viewing information on the second display while the videoconference is displayed on the first display. Accordingly, the camera for the videoconference was switched from the camera of the first display to the camera of the second display. Accordingly, the user appears to be engaged in the videoconference.

As an example implementation, two displays are provided, each having a webcam attached thereto (e.g., on top of the displays), commonly coupled (e.g., communicatively and/or electronically connected, directly or indirectly) to a computer. During operation a user may elect to participate in a videoconference, and thus execute (e.g., run) videoconference software. According to the example implementation, when the videoconferencing software is executed, both cameras are activated (e.g., turn on) and stream video to a module at the server side. The module determines which of the two cameras is to be selected for sending video to/through the video-conferencing application to other users.

While the foregoing example implementation is directed to two displays, the present disclosure is not limited thereto, and other configurations may be substituted therefor. For example, but not by way of limitation, the example implementations may also use cameras from multiple devices commonly coupled to the videoconferencing software application, such as a laptop computer and a tablet or smartphone.

The above-described module may determine the camera (and if necessary, the device) that has the best view of the user for the videoconference that reduces a negative impact of any multitasking. Techniques associated with the camera determination are described in greater detail below.

For the foregoing example implementations, a process is provided that may be implemented as a software module (e.g., non-transitory computer readable medium including instructions for selecting a camera), hardware (e.g., logic gates, circuit chip), or combination thereof. In the following example implementation, the process of camera selection is disclosed in a manner that would be understood by those skilled in the art to be implemented in software, hardware, or a combination thereof.

According to the example implementation a camera selection process is implemented that receives information from various types of inputs, and processes the received information to make a determination with respect to the camera to be selected. The various types of inputs are described as follows, and as illustrated in FIGS. 3A-3C.

Figure 3A:
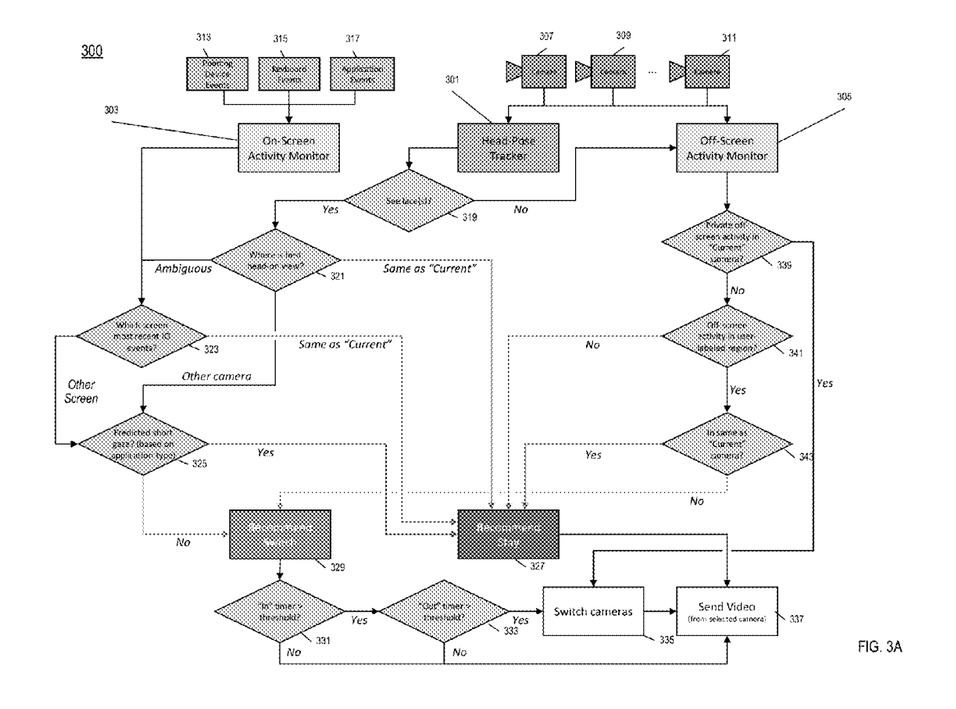
FIGS. 3A-3C illustrate example implementations and processes associated with a system of camera selection according to an example implementation.
Figure 3B:
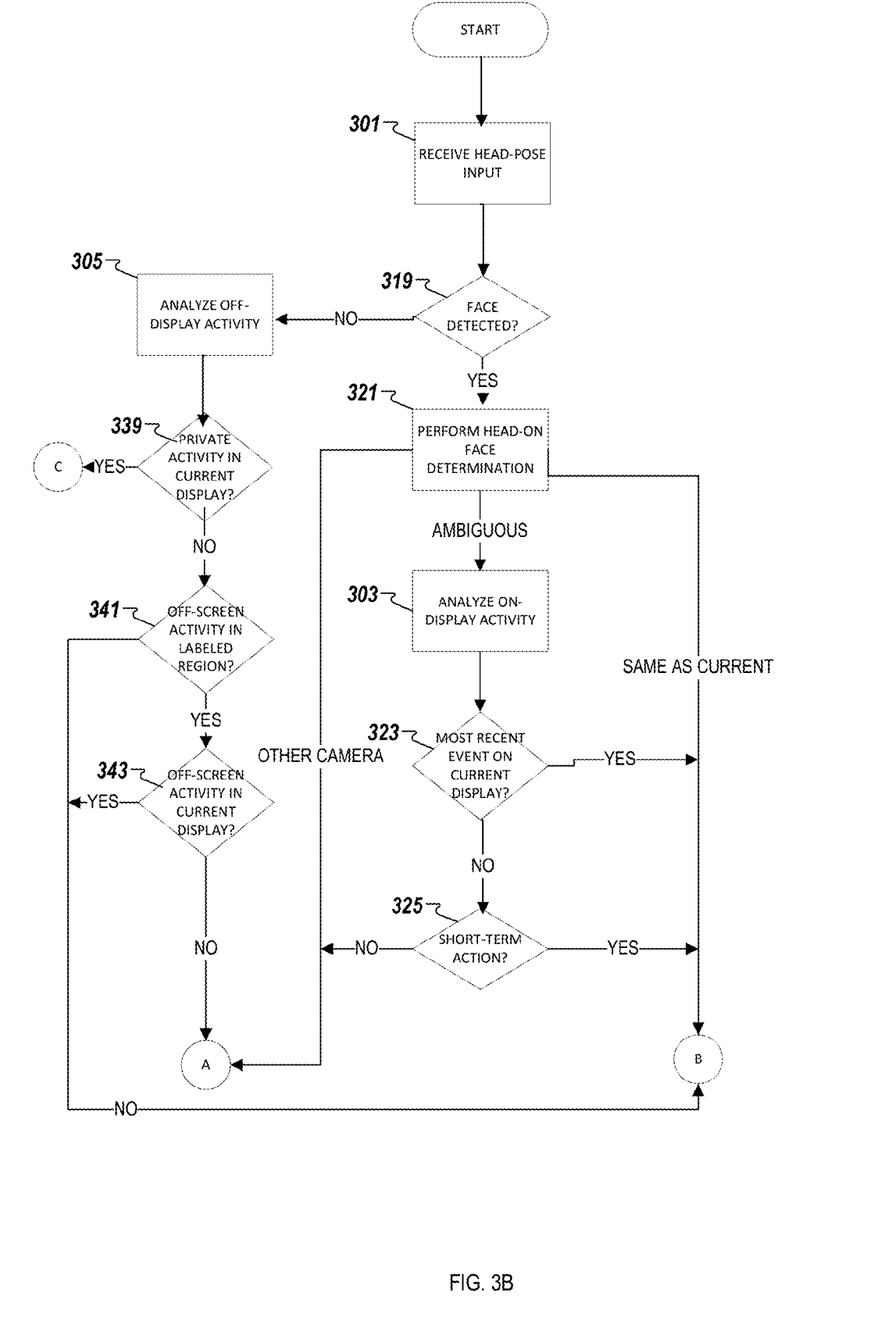
Figure 3C:
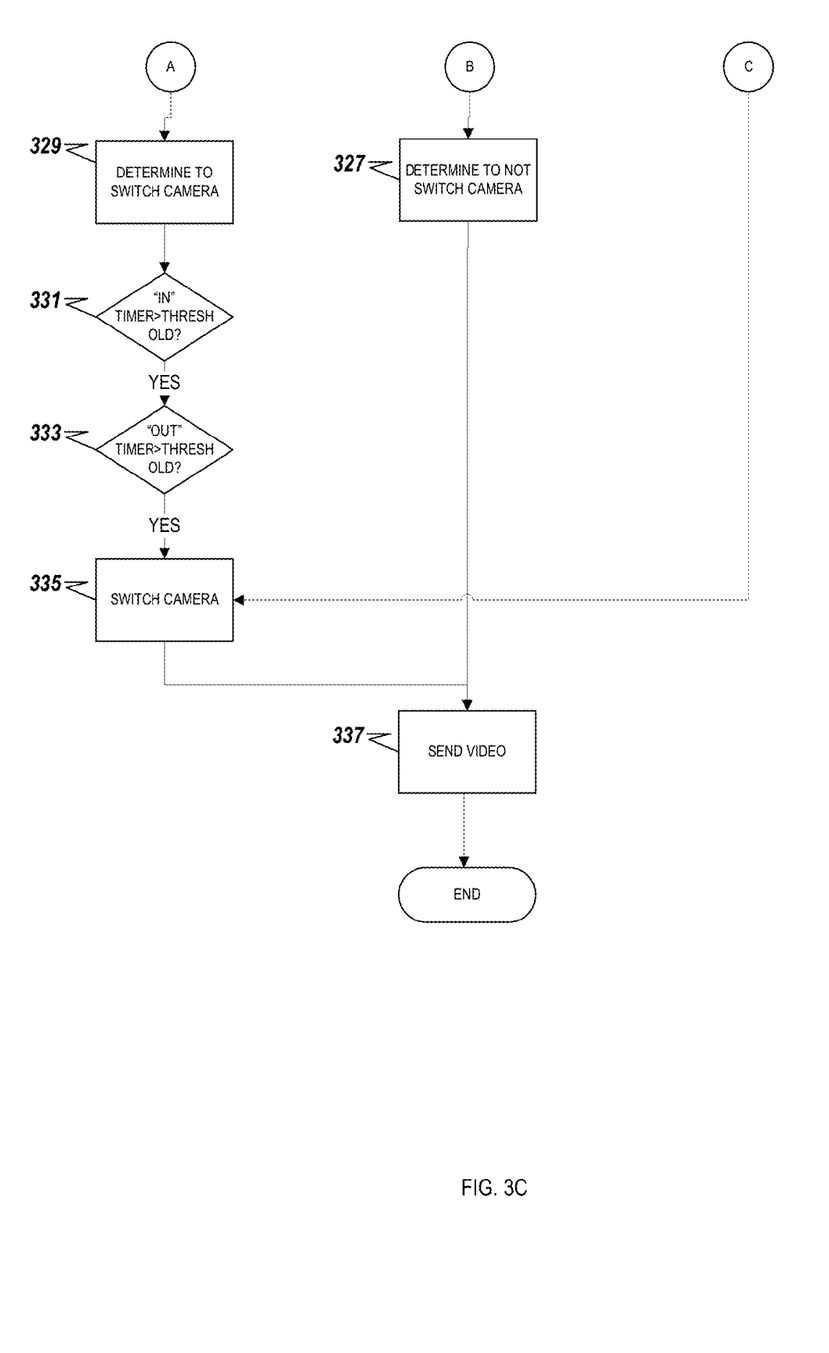

FIGS. 3A-3C illustrates example implementations of a system 300 of camera selection, including various input types, and inputs for each of the input types, a process of using the input information to determine a camera selection, and an output and action with respect to the camera selection determination. FIG. 3A is provided in the form of a system 300. Additionally, FIGS. 3B and 3C illustrate the example illustrations as explained below in a process flow, without illustrating limiting structures and/or architectures. The example systems and processes of FIGS. 3A-3C are disclosed as follows.

Input types may include, but are not limited to, gaze and head-pose tracking 301, on-display activity monitoring and/or analysis 303, and off-display activity monitoring and/or analysis 305. Each of these activities 301, 303, 305 is described in greater detail below. However, the present example implementation may include additional or different input types without departing from the present inventive scope.

As shown in 301, gaze and head-pose tracking may be used as an input type for the present example implementation. For example, but not by way of limitation, video received from a camera having a head-on view that is closest to the user's face may provide the remote observer in a videoconference with an impression that the user is looking towards. This is illustrated above, for example, in the illustration of FIG. 2, as compared with FIG. 1.

More specifically, according to an example implementation, facial detection may be employed in one or more of cameras 307, 309, 311. The gaze and head-pose tracker may collect image pose information for each frame on the display of choice (e.g., the display associated with the camera). While three cameras are disclosed in the illustration of FIG. 3A, the present inventive concept is not limited to this number, and a lesser or greater number of cameras may be used for facial detection according to well-known techniques, as would be understood by those skilled in the art. For example, facial detection may be implemented in each of the cameras 307, 309, 311, which may be associated with a first camera associated with the first display, a second camera associated with the second display, and a mobile device camera.

As shown in FIGS. 3A-3C at operation 319, it is determined whether a face of the user can be detected by the cameras 307, 309, 311. If so, the process proceeds to determine whether to switch cameras at operations 321-325 as explained below. If the cameras 307, 309, 311 cannot detect the face of the user, then the information of the off-display monitoring and/or analysis 305 is used, as explained below.

At operation 321, the camera associated with the best head-on view is determined, as explained below. If it is determined that the current camera that is used in the videoconference has the best head-on view, then it is recommended (e.g., determined or instructed) that the current camera stay as the camera used in the video conference at operation 327, and the videocamera sends the video at operation 337. If it is determined that another camera that is not used in the videoconference has the best head-on view, then at operation 325, a determination is made as to whether the activity is related to a short-term change (e.g., imminent return of the user's eyes to the current camera due to predicted short gaze). If the change is not considered short-term in operation 325, then a recommendation to switch is made at operation 329, followed by the optional use of an "in" timer threshold and an "out" timer threshold in operations 331 and 333, respectively, and a camera switching operation 335, followed by the videocamera sending the video at operation 337. If the change is considered short-term in operation 325, then a recommendation to not switch is made at operation 327.

In more detail, operation 321 may include one or more of the following circumstances. If only one of the cameras 307, 309, 311 detects the user's face, the head-pose is estimated to be in the direction of the display associated with that camera. If the camera that detects the user's face is not the camera that is currently being used for the videoconference, then this input is provided to the process, and as explained below, a determination is made to switch to that camera. For example, but not by way of limitation, if camera 307 detects the user's face (as opposed to a non-face region of the head, such as the side or the back of the head), then the user is deemed to be facing camera 307.

If camera 307 is not currently being used in the ongoing videoconference, but instead one of the other cameras (e.g., 309) is the camera that is currently being used in the video conference, then the other participants in the videoconference are not seeing the face of the user, and may observe the above-related impacts (e.g., more obvious disengagement of the user due to multitasking or distraction). To address this situation, a determination is made in the process to switch the camera that is being used in the videoconference from camera 309 to camera 307, such that the front face view of the user is observed in the videoconference, and the user appears to be more engaged in the videoconference, regardless of the multitasking activity. Further details of the switching determination and the switching implementation are discussed below in greater detail.

If a camera determines that multiple faces are present in a single view, no camera switching will be recommended, because the multiple faces may represent multiple participants in the video conference. However, according to an alternative embodiment explained below, the user may change this configuration for meetings in which the user does not expect others to join the videoconference as well. According to this alternative embodiment, the user may avoid having other persons shown (e.g., by blanking the display of the other users in the videoconference with respect to the input from the user, or employing a process to hide the other faces).

Thus, a user may avoid having a second face in the camera joining the videoconference unintentionally and distracting the other observers of the videoconference. For example, but not by way of limitation, the additional faces may be due to other persons present in the work area (e.g., videoconference in a room with many desks or cubicles where colleagues or co-workers are present), or other persons traveling behind the video conference area (e.g., walking by the hallway or on the other side of a room, or outside of a window).

If two or more of the cameras detect a face, and it is determined that the face belongs to the same user, then a pose estimation process is performed. In the pose estimation process, the relative degree to which the face is directed at each display is compared. For example, the relative angle of the face with respect to a direct view of cameras 307, 309 and 311 is compared. According to the results of the comparison, if the camera that is currently being used in the videoconference is the camera having the closest degree to a head-on view of the user, the process makes a determination to not switch the camera.

If the camera that is currently being used in the videoconference is the camera that does not have the closest degree to a head-on view of the user, the process makes a determination to switch the camera to the camera having the closest degree to a head-on view. Additionally, as explained below, the on-display input monitoring and/or analysis 303 may be incorporated into the determination.

If none of the cameras detects a face, then the head-pose tracker cannot make a determination about the proper camera. In this circumstance, the off-display monitoring and/or analysis 305 may be considered, as explained below.

If the head-pose tracking 301 cannot alone determine the best head-on view (e.g., ambiguous), then operation 323 may be performed to use the on-display activity monitoring and/or analysis 303, to determine which display associated with the camera has received the most recent relevant events. If it is determined that the current camera has received the most recent relevant events, then it is recommended that the current camera stay as the camera used in the video conference at operation 327, and the videocamera sends the video at operation 337. If it is determined that a display coupled with another camera has received the most recent relevant events, then at operation 325, a determination is made as to whether the activity is related to a short-term change (e.g., imminent return of the eyes of the user to the current camera due to application function or type, as explained below).

If the change is not considered short-term in operation 325, then a recommendation to switch is made at operation 329, followed by the optional use of an "in" timer threshold and an "out" timer threshold in operations 331 and 333, respectively, and a camera switching operation 335, followed by the videocamera sending the video at operation 337. If the change is considered short-term in operation 325, then a recommendation to not switch is made at operation 327. The details of operations 323 and 325 are discussed in greater detail below.

More specifically, with respect to operation 323, a camera may be determined as the recommended active camera (e.g., the camera that is currently being used in the videoconference to receive and transmit images and/or videos of the user) for the videoconference based on a correlation between the camera and ongoing computing activity that the user is performing on a display associated with the camera. This on-display activity type can be employed for each of the displays or other related display or input/output devices associated with a camera.

For example, but not by way of limitation, if the user is interacting with the pointing device associated with a pointing device event 313 (e.g., moving, pointing or scrolling, but not limited thereto), or is typing via a keyboard associated with a keyboard event 315 in a window on the display, this information can be used to determined which camera to recommend. Other input/output devices may be substituted therefor (e.g., touchscreen, mousepad, tracking ball, pointer, etc.) without departing from the inventive scope. Signals related to events may also be received by built-in device sensors (e.g., on a mobile device having a gyroscope, inertial measurement unit, touchscreen, or the like).

Thus, if the user interaction (e.g., with pointing device such as a mouse, or keyboard, or other input/output device) is associated with a camera that is not the current camera used in the videoconference, then it is likely that the user is actively looking at that display that is associated with the input/output event and device. Accordingly, a determination can be made that the camera should be switched to the camera associated with that display.

Additionally, with regard to operation 325, if the user is interacting with a display having a camera that is not currently associated with the videoconference, then the system can also use information associated with an application associated with an application event 317 the user is currently interacting with (and possibly looking at). This information may be used to estimate how long the user will continue to interact with that application, and to look at that part of the display. If the estimated duration is less than a threshold, the system will make a determination to avoid switching cameras.

For example, but not by way of limitation, if the event is an online email application having a user interface that indicates that a new email message has arrived, and the user is actively engaged with that application, then it can be determined that the incoming email notification function is being used. Because the incoming email notification is considered to be a function of an application that the user is likely to glance at quickly, and then return his or her gaze to the videoconference, the camera is determined to not be switched.

If, however, the user activates (e.g., clicks) on the incoming email notification and thus opens the email, this type of event is considered to require more of the user's time, and the user is more likely to maintain his or her gaze on the application. Accordingly, the process may determine that the camera should be switched to the camera of the display associated with the application, if this is not already the case.

The foregoing example of an online email application is just one example, and other applications that a user may interact with may be substituted therefor. For example, but not by way of limitation, applications such as browsers, word processors, spreadsheets, presentation or design tools, or other applications may be substituted therefore.

Similarly, rule bases may be developed that associate a function or feature of an application with an amount of time that a user will actively engage that application, and one or more rules may be included as to whether or not to make a camera switching determination based on that user interaction with the application. Such rules may be manually or automatically determined to generate rule bases for applications that may be used on a display during a videoconference event. As is understood in the art, the information from the applications may be provided to the system (e.g., by the operating system, videoconferencing software, or other process). To obtain the application information, the on-display activity recognizer may include a listening loop, as would be understood by those skilled in the art.

In addition to the head and gaze pose-tracking 301 and the on-display activity monitoring and/or analysis 303, the off-display activity input type 303 may be also be incorporated into the determination, as explained below.

Further details of operations 331 and 333 are described as follows.

In accordance with the example implementations, a determination may be made to switch from a first camera to a second camera, such as that based on a small change in the user's gaze (e.g., a quick glance at a second display). This determination may result in a very unpleasant experience (e.g., spastic camera behavior) for the remote participant in the videoconference. To address this situation, switch-in and switch-out thresholds may be employed, as explained below.

According to a first alternate implementation, the foregoing situation may be addressed may setting a camera switch for at least n milliseconds before a switch is accepted (e.g., switch-in threshold=500 msec). According to a second alternate implementation, following a camera switch, no other camera switch may be allowed for a prescribed period, such as at least m milliseconds (e.g., switch-out threshold=1000 msec). These criteria may ensure that a switch happens only if the user's gaze shifts for a minimum duration, and may also ensure that the camera view does not jump back for at least some minimum duration. The criteria may be used jointly or individually. Further, effects can be applied on the transition between cameras, such as a cross-fade, in lieu of a hard switch.

As explained above, if operation 319 determines that the head-pose tracking 301 cannot detect the face of the user, then the off-display activity monitoring and/or analysis 305 is implemented. At operation 339, it is determined whether the current camera associated with the videoconference is capturing activity that the user considers to be private or inappropriate for the videoconference, based on the user's preferences (the user can pre-enter such information, or indicate that the presence of other faces would fall into this circumstance, as explained in greater detail below). If the current camera includes such activity, the camera is switched, to protect privacy and avoid disturbance of the other participants in the videoconference, at operation 335, followed by sending of the video from the newly determined videoconference camera at operation 337. If the current camera does not include such private activity, at operation 341, it is determined whether there is any off-display activity in a region of the user. If not, then the camera is recommended to not switch at operation 327. If so, then at operation 343, it is determined whether the off-display activity is in the current camera being used in the videoconference. If not, then the camera is recommended to switch at operation 329, and the switching process of operations 331, 333, 335 and 337 commences, as explained above. If the off-display activity is in the current camera being used in the videoconference, then the camera is recommended to not switch at operation 327 (e.g., use of a board or the like).

Further details of these operations 339-343 are explained below.

As noted above, according to the off-display activity monitoring and/or analysis 305, if none of the cameras 307, 309, 311 can determine that a face of the user is head-on, then the determination of which camera to use may be performed by on-display activity monitoring and/or analysis 303 as explained above, or off-display activity monitoring and/or analysis 305, as explained herein. For example, but not by way of limitation, the user may physically turn around in his or her chair to draw something on a physical board (e.g., markerboard, chalkboard, whiteboard, etc.) to provide a visual demonstration to the remote participants in the videoconference.

According to the example implementation, views from the cameras 307, 309, 311 may be used to estimate interaction on a vertical plane (e.g., writing on a board), and select the camera that can provide the remote participants with a better view of the content on the board. For example, the system may determine that the camera providing the best view is the one that is a head-on view of the board, or the camera that is least obstructed by the user or other object such as a chair, or the camera that has the best parameter rating for parameters such as glare, brightness, contrast, clarity, etc., or a combination of these factors.

While the foregoing example is directed to a board, this is for explanation purposes only, and other examples of use of the space associated with the user's surroundings may be substituted therefor without departing from the inventive scope. Additionally, as explained below, information about the space behind the user can be provided by the user for configuration and space-annotation processes.

In addition to the foregoing example system and process, a user may configure one or more aspects, as explained below. According to one example configuration, a user may include in her or his settings for the account of the videoconference system a configuration that includes information associated with the space of the user that may be used during the videoconference. For example, but not by way of limitation, the user may annotate locations within the user's physical space on an online camera image. According to such an example implementation, the user is provided with a view (e.g., photo) of the space from each of the multiple cameras.

The user may then click on different objects, areas, or surfaces in the view of one or more of the cameras, and annotate the views (e.g., positive or negative). For example, but not by way of limitation, a positive annotation may indicate that the example implementation should display that surface or object if the user is not facing the displays or interacting with any of the displays, during the videoconference. An example of surfaces that a user might annotate as positive may include (but are not limited to) a whiteboard or tabletop. On the other hand, a negative annotation may indicate that the example implementation should avoid display of that area when the user is not facing the display or interacting with any of the displays, during the videoconference. An example of an area that a user might want to annotate as negative includes, but is not limited to, their door to a hallway, or a window.

Another example configuration by a user may be related to how the example implementation processes the appearance of multiple faces in the cameras. For example, if one camera has a view of only the user, but the second camera also sees a second person (e.g., a co-worker in the same room, or a person passing by the office), the user may indicate that the system should prefer the camera that sees only the user, for example to protect the privacy of the other person or avoid distraction during the videoconference.

Figure 4:
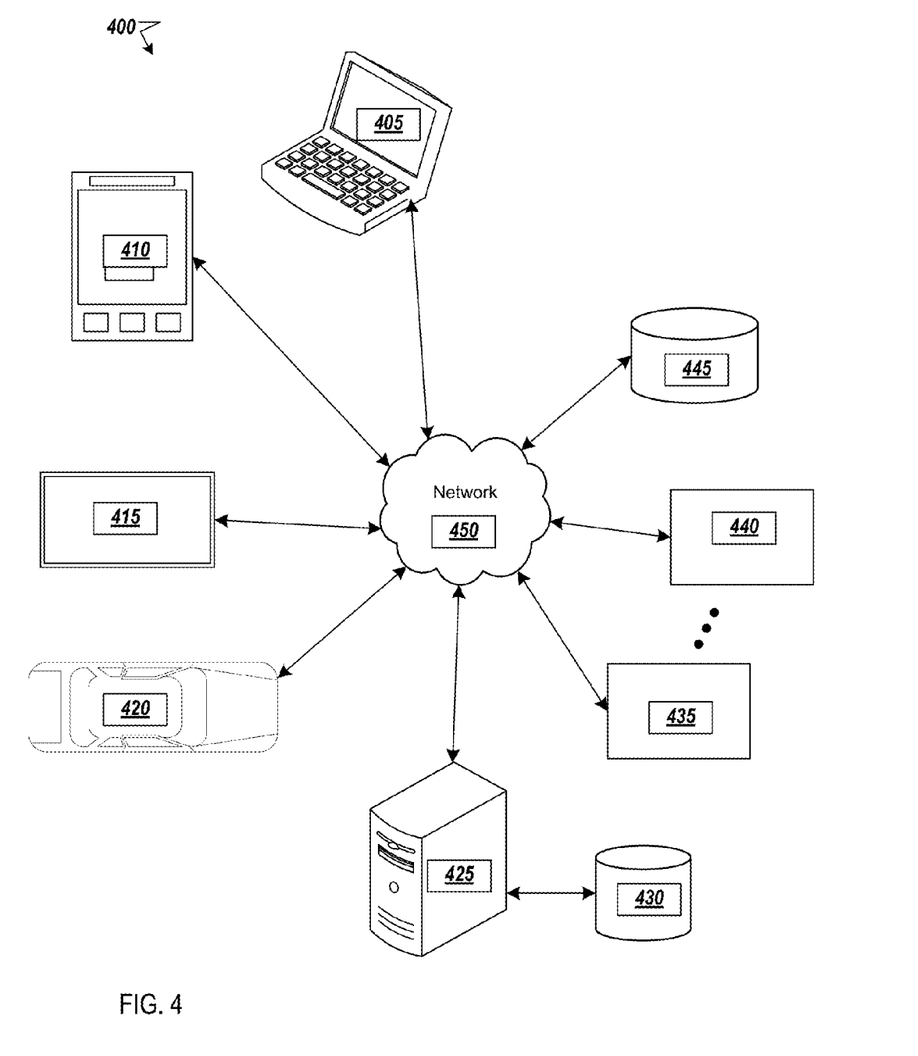
FIG. 4 shows an example environment suitable for some example implementations.

FIG. 4 shows an example environment suitable for some example implementations. Environment 400 includes devices 405-445, and each is communicatively connected to at least one other device via, for example, network 460 (e.g., by wired and/or wireless connections). Some devices may be communicatively connected to one or more storage devices 430 and 445.

An example of one or more devices 405-445 may be computing devices 505 described below in FIG. 5, respectively. Devices 405-445 may include, but are not limited to, a computer 405 (e.g., a laptop computing device) having a display and as associated webcam as explained above, a mobile device 410 (e.g., smartphone or tablet), a television 415, a device associated with a vehicle 420, a server computer 425, computing devices 435-440, storage devices 430 and 445. As explained above, the meeting environment of the user may vary, and is not limited to an office environment.

In some implementations, devices 405-420 may be considered user devices associated with the users of the enterprise. Devices 425-445 may be devices associated with service providers (e.g., used by the external host to provide services as described above and with respect to FIGS. 3A-3C, and/or store data, such as webpages, text, text portions, images, image portions, audios, audio segments, videos, video segments, and/or information thereabout).

Figure 5:
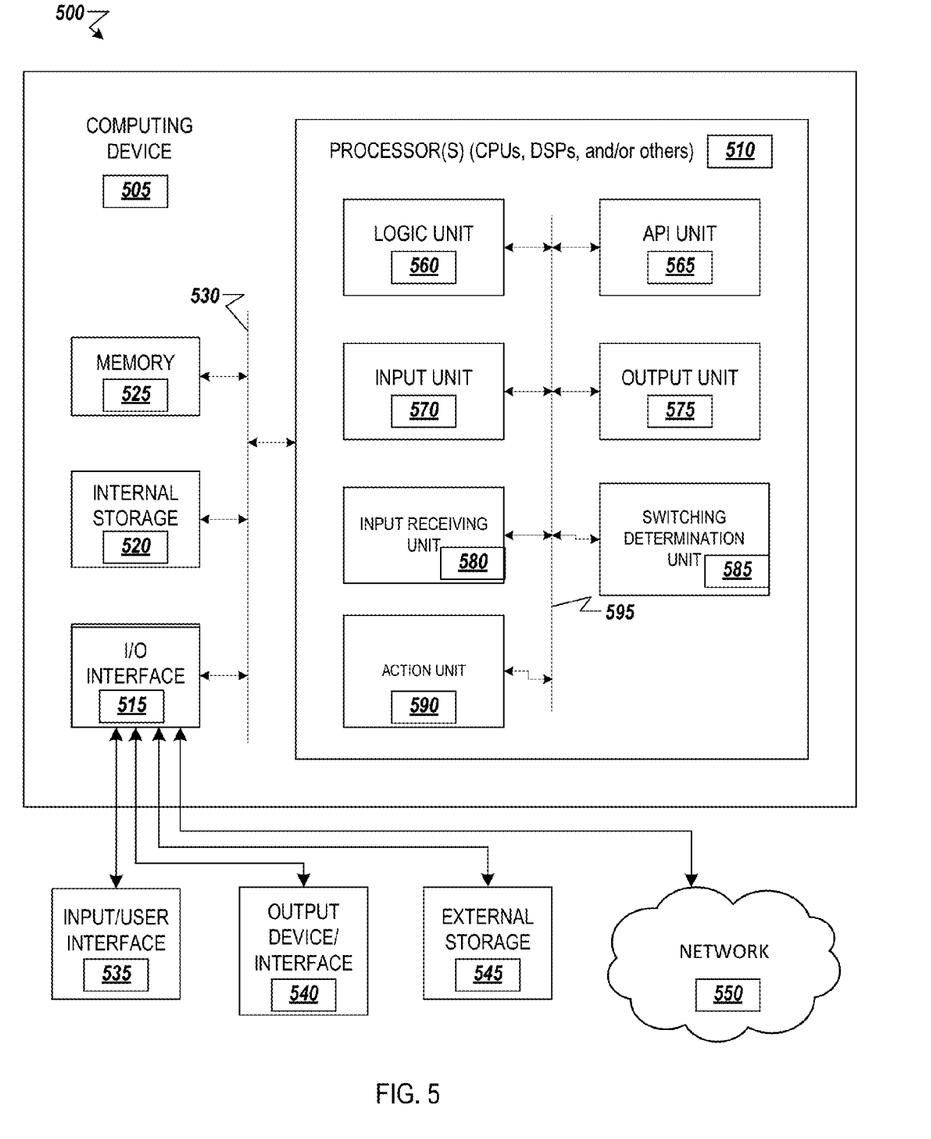
FIG. 5 illustrates an example computing environment with an example computer device suitable for use in some example implementations.

FIG. 5 shows an example computing environment with an example computing device associated with the external host for use in some example implementations. Computing device 505 in computing environment 500 can include one or more processing units, cores, or processors 510, memory 515 (e.g., RAM, ROM, and/or the like), internal storage 520 (e.g., magnetic, optical, solid state storage, and/or organic), and/or I/O interface 525, any of which can be coupled on a communication mechanism or bus 530 for communicating information or embedded in the computing device 505.

Computing device 505 can be communicatively coupled to input/user interface 535 and output device/interface 540. Either one or both of input/user interface 535 and output device/interface 540 can be a wired or wireless interface and can be detachable. Input/user interface 535 may include any device, component, sensor, or interface, physical or virtual, that can be used to provide input (e.g., buttons, touchscreen interface, keyboard, a pointing/cursor control, microphone, camera, braille, motion sensor, optical reader, and/or the like).

Output device/interface 540 may include a display, television, monitor, printer, speaker, braille, or the like. In some example implementations, input/user interface 535 and output device/interface 540 can be embedded with or physically coupled to the computing device 505. In other example implementations, other computing devices may function as or provide the functions of input/user interface 535 and output device/interface 540 for a computing device 505.

Examples of computing device 505 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 505 can be communicatively coupled (e.g., via I/O interface 525) to external storage 545 and network 550 for communicating with any number of networked components, devices, and systems, including one or more computing devices of the same or different configuration. Computing device 505 or any connected computing device can be functioning as, providing services of, or referred to as a server, client, thin server, general machine, special-purpose machine, or another label.

The I/O interface 525 may include wireless communication components (not shown) that facilitate wireless communication over a voice and/or over a data network. The wireless communication components may include an antenna system with one or more antennae, a radio system, a baseband system, or any combination thereof. Radio frequency (RF) signals may be transmitted and received over the air by the antenna system under the management of the radio system.

I/O interface 525 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 500. Network 550 can be any network or combination of networks (e.g., the Internet, local area network, wide area network, a telephonic network, a cellular network, satellite network, and the like).

Computing device 505 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 505 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 510 can execute under any operating system (OS) (not shown), in a native or virtual environment. One or more applications can be deployed that include logic unit 560, application programming interface (API) unit 565, input unit 570, output unit 575, input receiving unit 580, switching determination unit 585, and action unit 590 and inter-unit communication mechanism 595 for the different units to communicate with each other, with the OS, and with other applications (not shown). For example, input receiving unit 580, switching determination unit 585, and action unit 590 may implement one or more processes shown in FIGS. 4-5. The described units and elements can be varied in design, function, configuration, or implementation and are not limited to the descriptions provided.

In some example implementations, when information or an execution instruction is received by API unit 565, it may be communicated to one or more other units (e.g., logic unit 560, input unit 570, output unit 575, input receiving unit 580, switching determination unit 585, and action unit 590).

Input receiving unit 580 may, via API unit 565, interact with the switching determination unit 585 to provide the input information of head-pose tracking 301, on-display activity monitoring and/or analysis 303 and off-display activity monitoring and/or analysis 305. Using API unit 565, switching determination unit 585 may interact with action unit 590 to provide the determination as to whether the camera is to be switched, and the new camera to be used for the videoconference, so that the action unit 590 may perform operations 331-337 related to the switching of the camera and sending of the video, for example.

In some instances, logic unit 560 may be configured to control the information flow among the units and direct the services provided by API unit 565, input unit 570, output unit 575, input receiving unit 580, switching determination unit 585, and action unit 590 in some example implementations described above. For example, the flow of one or more processes or implementations may be controlled by logic unit 560 alone or in conjunction with API unit 565.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium.

A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method operations. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application.

Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

The example implementations may have various differences and advantages over related art. For example, but not by way of limitation, as opposed to instrumenting web pages with Javascript as explained above with respect to the related art, text and mouse (e.g., pointing) actions may be detected and analyzed in video documents.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method of managing a videoconference viewed by a first camera coupled to a first display, the method comprising:
 for a face not detected by the first camera and a second camera coupled to a second display in a user environment, performing an action based on off-display analysis;
 for a face direction that is less head-on in the first camera than in the second camera, switching the videoconference to the second camera; and
 for the face direction not detectable in the first camera, and on-display user activity detected at the second display, based on a time duration that the on-display user activity will be accessed, as estimated by applying a rule based on a function of the on-display user activity accessed at the second display, being greater than a prescribed period, switching the videoconference to the second camera.

2. The method of claim 1, wherein the on-display user activity comprises at least one of an input/output event and an application event.

3. The method of claim 2, wherein the input/output event comprises one or more of a pointing device action and a keyboard action, associated with cursor activity on the second display.

4. The method of claim 2, wherein the application event comprises:
 determining that the function is associated with an online application being accessed at the second display;
 estimating the time duration that the online application will be accessed by applying the rule that is based on the function of the application; and
 based on the estimated time duration being greater than the prescribed period, performing the switching the videoconference to the second camera.

5. The method of claim 1, wherein the switching the videoconference to the second camera further comprises:
 determining to switch to the second camera;
 confirming that a first prescribed time period has elapsed since the determining;
 based on the confirming, switching an input signal into the videoconference from the first camera to the second camera; and
 outputting a video to the videoconference via the second camera.

6. The method of claim 1, wherein the switching the videoconference to the second camera further comprises:
 determining to switch to the second camera;
 confirming that no other switching operation was performed on the first camera and the second camera for a prescribed time prior to the determining;
 based on the confirming, switching an input signal into the videoconference from the first camera to the second camera; and
 outputting a video to the videoconference via the second camera.

7. The method of claim 1, wherein an environment of the user of the first camera and the second camera is annotated with at least one of a positive annotation indicative of a surface or object in the environment that is to be displayed in the videoconference, and a negative annotation indicative of a surface or object in the environment that is not to be displayed in the videoconference.

8. The method of claim 7, wherein the positive annotation is associated with a display board in the environment that is not coupled to the first camera and the second camera, and the negative annotation is associated with a doorway or window region not to be displayed, or another user.

9. The method of claim 1, wherein the off-display activity comprises:
 analyzing a video of an off-display environment of the first camera and the second camera;
 detecting a focus area to display in the videoconference; and
 performing the action, wherein the action comprises determining to switch the videoconference from the first camera to the second camera when the second camera has a view of the focus area with less obstruction and a higher degree of view than the first camera.

10. The method of claim 1, wherein the switching the videoconference to the second camera is not performed if the face direction is less head-on in the first camera than in the second camera, or if the on-display user activity occurs at the second display, for less than a prescribed time period.

11. A system for managing a video conference, comprising:
 a first camera coupled to a first display and a second camera coupled to a second display in a user environment;
 a user environment adjacent to the first camera and the second camera, the user environment including at least one physical display surface not coupled to the first camera and the second camera; and
 a processor configured to:
 perform an off-display analysis when a face is not detected by the first camera and the second camera, and perform an action based on the off-display analysis,
 switch the videoconference to the second camera when (a) a face direction is less head-on in the first camera than in the second camera, or (b) the face direction is not detectable in the first camera and on-display user activity is detected at the second display based on a time duration that the on-display user activity will be accessed, as estimated by applying a rule based on a function of the on-display user activity accessed at the second display, being greater than a prescribed period.

12. The system of claim 11, wherein the on-display user activity comprises one or more of a pointing device action and a keyboard action associated with cursor activity on the second display, or an application event that comprises the processor:
 determining that the function is associated with an online application being accessed at the second display;
 estimating the time duration that the online application will be accessed by applying a rule that is based on the function of the application; and
 based on the estimated time duration greater than the prescribed period, performing the switching the videoconference to the second camera.

13. The system of claim 11, wherein the processor switches the videoconference to the second camera by determining to switch to the second camera, confirming that a first prescribed time period has elapsed since the determining, or that no other switching operation was performed on the first camera and the second camera for a prescribed time prior to the determining, based on the confirming, switching an input signal into the videoconference from the first camera to the second camera, and outputting a video to the videoconference via the second camera.

14. The system of claim 11, wherein an environment of the user of the first camera and the second camera is annotated with at least one of a positive annotation indicative of a surface or object in the environment that is to be displayed in the videoconference, and a negative annotation indicative of a surface or object in the environment that is not to be displayed in the videoconference.

15. The system of claim 11, wherein the off-display activity comprises:
 analyzing a video of an off-display environment of the first camera and the second camera;
 detecting a focus area to display in the videoconference; and
 performing the action, wherein the action comprises determining to switch the videoconference from the first camera to the second camera when the second camera has a view of the focus area with less obstruction and a higher degree of view than the first camera.

16. A non-transitory computer readable medium, storing instructions for managing videoconference input and display, the instructions comprising:
 for a face not detected by the first camera and a second camera coupled to a second display in a user environment, performing an action based on off-display analysis;
 for a face direction that is less head-on in the first camera than in the second camera, switching the videoconference to the second camera; and
 for the face direction not detectable in the first camera, and on-display user activity detected at the second display, based on a time duration that the on-display user activity will be accessed, as estimated by applying a rule based on a function of the on-display user activity accessed at the second display, being greater than a prescribed period, switching the videoconference to the second camera.

17. The non-transitory computer readable medium of claim 16, wherein the on-display user activity comprises:
 determining that the function is associated with an online application being accessed at the second display;
 estimating the time duration that the online application will be accessed by applying a rule that is based on the function of the application; and
 based on the estimated time duration greater than the prescribed period, performing the switching the videoconference to the second camera.

18. The non-transitory computer readable medium of claim 16, wherein the switching the videoconference to the second camera further comprises:
 determining to switch to the second camera;
 confirming that a first prescribed time period has elapsed since the determining, or that no other switching operation has been performed for the first camera and the second camera for a prescribed time prior to the determining;
 based on the confirming, switching an input signal into the videoconference from the first camera to the second camera; and
 outputting a video to the videoconference via the second camera.

19. The non-transitory computer readable medium of claim 16, wherein an environment of the user of the first camera and the second cis annotated with at least one of a positive annotation indicative of a surface or object in the environment that is to be displayed in the videoconference, and a negative annotation indicative of a surface or object in the environment that is not to be displayed in the videoconference.

20. The non-transitory computer readable medium of claim 16, wherein the off-display activity comprises:
 analyzing a video of an off-display environment of the first camera and the second camera;
 detecting a focus area to display in the videoconference; and
 performing the action, wherein the action comprises determining to switch the videoconference from the first camera to the second camera when the second camera has a view of the focus area with less obstruction and a higher degree of view than the first camera.

21. A method of managing a videoconference viewed by a first camera coupled to a first display, the method comprising:
 for a face not detected by the first camera and a second camera coupled to a second display in a user environment, performing an action based on off-display analysis;
 for a face direction that is less head-on in the first camera than in the second camera, switching the videoconference to the second camera; and
 for the face direction not detectable in the first camera, and on-display user activity detected at the second display, switching the videoconference to the second camera,
 wherein the on-display user activity comprises at least one of an input/output event and an application event that comprises,
  determining that a function of an online application is being accessed at the second display,
  estimating a time duration that the online application will be accessed by applying a rule that is based on the function of the application, and
 based on the estimated time duration being greater than a prescribed period, performing the switching the videoconference to the second camera.

22. A system for managing a video conference, comprising:
 a first camera coupled to a first display and a second camera coupled to a second display in a user environment;
 a user environment adjacent to the first camera and the second camera, the user environment including at least one physical display surface not coupled to the first camera and the second camera; and
 a processor configured to:
 perform an off-display analysis when a face is not detected by the first camera and the second camera, and perform an action based on the off-display analysis,
 switch the videoconference to the second camera when (a) a face direction is less head-on in the first camera than in the second camera, or (b) the face direction is not detectable in the first camera and on-display user activity is detected at the second display,
 wherein the on-display user activity comprises one or more of a pointing device action and a keyboard action associated with cursor activity on the second display, or an application event that comprises the processor:
  determining that a function of an online application is being accessed at the second display,
  estimating a time duration that the online application will be accessed by applying a rule that is based on the function of the application, and based on the estimated time duration greater than a prescribed period, performing the switching the videoconference to the second camera.

23. non-transitory computer readable medium, storing instructions for managing videoconference input and display, the instructions comprising:

for a face not detected by the first camera and a second camera coupled to a second display in a user environment, performing an action based on off-display analysis;

for a face direction that is less head-on in the first camera than in the second camera, switching the videoconference to the second camera; and for the face direction not detectable in the first camera, and on-display user activity detected at the second display, switching the videoconference to the second camera wherein the on-display user activity comprises,
  determining that a function of an online application is being accessed at the second display,
  estimating a time duration that the online application will be accessed by applying a rule based on the function of the application, and
  based on the estimated time duration greater than a prescribed period, performing the switching the videoconference to the second camera.

* * * * *